United States Patent
Abe et al.

(10) Patent No.: US 9,620,816 B2
(45) Date of Patent: Apr. 11, 2017

(54) NON-AQUEOUS ELECTROLYTE SOLUTION AND ELECTRICITY-STORAGE DEVICE USING SAME

(71) Applicant: UBE INDUSTRIES, LTD., Ube-shi (JP)

(72) Inventors: Koji Abe, Yamaguchi (JP); Masahide Kondo, Yamaguchi (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 331 days.

(21) Appl. No.: 14/351,697

(22) PCT Filed: Oct. 16, 2012

(86) PCT No.: PCT/JP2012/076690
§ 371 (c)(1),
(2) Date: Apr. 14, 2014

(87) PCT Pub. No.: WO2013/058235
PCT Pub. Date: Apr. 25, 2013

(65) Prior Publication Data
US 2014/0234727 A1 Aug. 21, 2014

(30) Foreign Application Priority Data
Oct. 17, 2011 (JP) ................................. 2011-227648

(51) Int. Cl.
*H01M 10/0567* (2010.01)
*H01M 10/0569* (2010.01)
*H01M 10/0568* (2010.01)
*H01M 10/0525* (2010.01)
*H01M 10/052* (2010.01)
*H01G 11/06* (2013.01)
*H01G 11/60* (2013.01)
*H01G 11/64* (2013.01)

(52) U.S. Cl.
CPC ... *H01M 10/0567* (2013.01); *H01M 10/0525* (2013.01); *H01M 10/0568* (2013.01); *H01M 10/0569* (2013.01); *H01G 11/06* (2013.01); *H01G 11/60* (2013.01); *H01G 11/64* (2013.01); *H01M 10/052* (2013.01); *H01M 2300/0037* (2013.01); *Y02E 60/122* (2013.01);
(Continued)

(58) Field of Classification Search
CPC ......... H01M 10/0567; H01M 10/0569; H01M 10/0568; H01M 10/0525; H01M 10/052; H01M 2300/0037; Y02E 60/122
See application file for complete search history.

(56) References Cited

U.S. PATENT DOCUMENTS

| 6,045,937 A * | 4/2000 | Kolb | H01M 4/0442 |
| | | | 429/59 |
| 6,168,878 B1 * | 1/2001 | Fauteux | H01M 4/0438 |
| | | | 429/105 |

(Continued)

FOREIGN PATENT DOCUMENTS

EP   2 058 882 A1   5/2009
JP   2005-93293   4/2005
(Continued)

OTHER PUBLICATIONS

Extended European Search Report issued Sep. 10, 2015 in Patent Application No. 12841924.9.
(Continued)

*Primary Examiner* — Laura Weiner
(74) *Attorney, Agent, or Firm* — Oblon, McClelland, Maier & Neustadt, L.L.P.

(57) ABSTRACT

A nonaqueous electrolytic solution that is capable of improving the electrochemical characteristics in a broad temperature range, and an energy storage device using the same are provided, and the nonaqueous electrolytic solution contains a nonaqueous solvent having dissolved therein an electrolyte salt, in which the nonaqueous solvent contains two or more kinds of cyclic carbonates selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate and 4-ethynyl-1,3-dioxolan-2-one, and the nonaqueous electrolytic solution further contains a cyclic acid anhydride represented by the following general formula (I) having bonded thereto a side chain that has 3 or more carbon atoms and has a double bond or a triple bond at an end thereof in an amount of from 0.01 to 10% by mass:

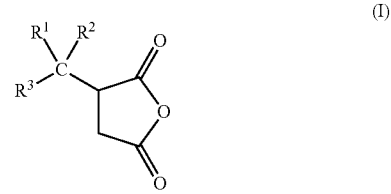

(I)

wherein $R^1$ and $R^2$ each independently represent a hydrogen atom, a halogen atom or an alkyl group having from 1 to 6 carbon atoms, at least one hydrogen atom of which may be substituted by a halogen atom; and $R^3$ represents a linear or branched alkenyl group having from 2 to 4 carbon atoms and having a double bond at an end thereof or a linear or branched alkynyl group having from 2 to 4 carbon atoms and having a triple bond at an end thereof.

18 Claims, No Drawings

(52) U.S. Cl.
    CPC ............ *Y02E 60/13* (2013.01); *Y02T 10/7011* (2013.01); *Y02T 10/7022* (2013.01)

(56) References Cited

U.S. PATENT DOCUMENTS

| | | |
|---|---|---|
| 2005/0069766 A1 | 3/2005 | Takahashi |
| 2007/0243471 A1 | 10/2007 | Takahashi |
| 2008/0206649 A1 | 8/2008 | Kawashima |
| 2008/0241702 A1 | 10/2008 | Takahashi |
| 2009/0325069 A1 | 12/2009 | Anada et al. |

FOREIGN PATENT DOCUMENTS

| | | |
|---|---|---|
| JP | 2005-100740 A | 4/2005 |
| JP | 2006-66320 | 3/2006 |
| JP | 2006-294414 | 10/2006 |
| JP | 2007-287518 | 11/2007 |
| JP | 2008-243642 | 10/2008 |
| JP | 2011-54490 | 3/2011 |
| JP | 2011-60464 | 3/2011 |
| KR | 10-0801592 B1 | 2/2008 |

OTHER PUBLICATIONS

International Search Report issued Nov. 20, 2012, in PCT/JP2012/076690, filed Oct. 16, 2012.

\* cited by examiner

NON-AQUEOUS ELECTROLYTE SOLUTION AND ELECTRICITY-STORAGE DEVICE USING SAME

TECHNICAL FIELD

The present invention relates to a nonaqueous electrolytic solution capable of improving electrochemical characteristics in a broad temperature range of an energy storage device, and an energy storage device using the same.

BACKGROUND ART

An energy storage device, especially a lithium secondary battery, has been widely used recently for a small-sized electronic device, such as a mobile telephone and a notebook personal computer, an electric vehicle, and an electric power storage. The electronic devices and vehicles may be used in a broad temperature range, for example, at midsummer high temperatures and frigid low temperatures, and therefore the energy storage device is required to have well-balanced and improved electrochemical characteristics in a broad temperature range.

Especially for preventing global warming, it is imperative to reduce $CO_2$ emissions, and among eco-friendly vehicles having mounted thereon an energy storage equipment containing an energy storage device, such as a lithium secondary battery and a capacitor, early popularization of a hybrid electric vehicle (HEV), a plug-in hybrid electric vehicle (PHEV) and a battery electric vehicle (BEV) is being desired. Vehicles may travel long distance and therefore may be used in regions with a broad temperature range covering from extremely-hot tropical regions to frigid regions. In particular, therefore, the in-vehicle energy storage device is demanded to have electrochemical characteristics that are not deteriorated even used in a broad temperature range covering from high temperatures to low temperatures.

In this specification, the term, lithium secondary battery, referred herein is used as a concept including a so-called lithium ion secondary battery.

A lithium secondary battery is mainly constituted by a positive electrode and a negative electrode, which contains a material capable of absorbing and releasing lithium, and a nonaqueous electrolytic solution containing a lithium salt and a nonaqueous solvent. Examples of the nonaqueous solvent used include a carbonate, such as ethylene carbonate (EC) and propylene carbonate (PC).

Known examples of the negative electrode include metal lithium, and a metal compounds (a metal elemental substance, an oxide and an alloy with lithium, etc.) and a carbon material capable of absorbing and releasing lithium. In particular, a lithium secondary battery using a carbon material capable of absorbing and releasing lithium, such as coke, artificial graphite and natural graphite, has been widely put into practical use.

For example, it is known that, in a lithium secondary battery using a highly-crystalline carbon material, such as natural graphite and artificial graphite as the negative electrode material therein, a decomposed product and gas generated through reductive decomposition of the solvent in the nonaqueous electrolytic solution on the surface of the negative electrode during charging inhibits the electrochemical reaction favorable for the battery, which may worsen the cycle property of the battery. Deposition of the decomposed product of the nonaqueous solvent inhibits smooth absorption and release of lithium by the negative electrode, which may worsen the electrochemical characteristics of the battery on using in a broad temperature range.

Furthermore, it is known that a lithium secondary battery using a lithium metal or an alloy thereof, or a metal elemental substance, such as tin and silicon, or a metal oxide thereof as the negative electrode material may have a high initial battery capacity, but the battery capacity and the battery performance thereof, such as the cycle property, may be largely worsened since the micronized powdering of the material may be promoted during cycles, which brings about accelerated reductive decomposition of the nonaqueous solvent, as compared with the negative electrode formed of a carbon material. In addition, the micronized powdering of the negative electrode material and the deposition of the decomposed product of the nonaqueous solvent may inhibit smooth absorption and release of lithium by the negative electrode, and thereby the electrochemical characteristics of the battery used in abroad temperature range may be worsened.

On the other hand, it is also known that, in a lithium secondary battery using, for example, $LiCoO_2$, $LiMn_2O_4$, $LiNiO_2$, $LiFePO_4$ or the like as the positive electrode, the nonaqueous solvent in the nonaqueous electrolytic solution locally undergoes partial oxidative decomposition at the interface between the positive electrode material and the nonaqueous electrolytic solution in a charged state, the decomposed product and the gas generated thereby may inhibit the electrochemical reaction favorable for the battery, and thereby the electrochemical characteristics of the battery may be worsened on using in a broad temperature range.

As described above, the decomposed product and the gas generated through decomposition of the nonaqueous electrolytic solution on the positive electrode or the negative electrode may inhibit migration of lithium ions or may swell the battery, which may worsen the battery performance. Irrespective of the situation, the multifunctionality of electronic appliances equipped with lithium secondary batteries therein is more and more enhanced and power consumption tends to increase. The capacity of lithium secondary battery is thus being much increased, and the space volume for the nonaqueous electrolytic solution in the battery is decreased by increasing the density of the electrode and by reducing the useless space volume in the battery. Accordingly, the current situation is that the electrochemical characteristics in a broad temperature range of the battery may be worsened even with decomposition of only a small amount of the nonaqueous electrolytic solution.

PTL 1 proposes a nonaqueous electrolytic solution that has a particular unsaturated cyclic acid anhydride added thereto, and discloses that the cycle property may be improved thereby.

PTL 2 proposes a nonaqueous electrolytic solution that contains a carboxylic anhydride organic compound obtained through reaction of maleic anhydride and 1-pentene, and discloses that the storage properties may be improved thereby.

PTL 3 proposes a nonaqueous electrolytic solution that contains a mixture of maleic anhydride and N-methylsuccinimide, and discloses that the charge storage properties may be improved thereby.

CITATION LIST

Patent Literature

PTL 1: JP-A-2011-60464
PTL 2: JP-A-2006-66320
PTL 3: JP-A-2005-93293

SUMMARY OF INVENTION

Technical Problem

An object of the present invention is to provide a nonaqueous electrolytic solution that is capable of improving the electrochemical characteristics in a broad temperature range, and an energy storage device using the same.

Solution to Problem

As a result of detailed studies made by the present inventors on the performance of the nonaqueous electrolytic solutions in the aforementioned ordinary techniques, it is found that the nonaqueous electrolytic solutions of the above-mentioned patent literature may be insufficient for solving the problem of improving the electrochemical characteristics in a broad temperature range, such as the low-temperature discharge properties after high-temperature storage of an energy storage device.

The present inventors have thus made earnest investigations for solving the problem and have found that the electrochemical characteristics in a broad temperature range, particularly the electrochemical characteristics of the lithium battery, may be improved by a nonaqueous solvent that contains two or more kinds of cyclic carbonates selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate and 4-ethynyl-1,3-dioxolan-2-one, and a nonaqueous electrolytic solution that contains a particular cyclic acid anhydride having bonded thereto a side chain that has 3 or more carbon atoms and has a double bond or a triple bond at an end thereof, and thus the present invention has been completed.

The present invention provides the following items (1) and (2).

(1) A nonaqueous electrolytic solution comprising a nonaqueous solvent having dissolved therein an electrolyte salt, the nonaqueous solvent containing two or more kinds of cyclic carbonates selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate and 4-ethynyl-1,3-dioxolan-2-one, the nonaqueous electrolytic solution further containing a cyclic acid anhydride represented by the following general formula (I) having bonded thereto a side chain that has 3 or more carbon atoms and has a double bond or a triple bond at an end thereof in an amount of from 0.01 to 10% by mass:

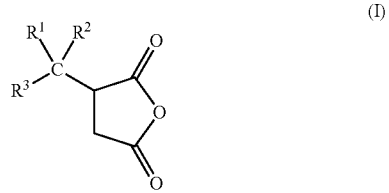

(I)

wherein $R^1$ and $R^2$ each independently represent a hydrogen atom, a halogen atom or an alkyl group having from 1 to 6 carbon atoms, at least one hydrogen atom of which may be substituted by a halogen atom; and $R^3$ represents a linear or branched alkenyl group having from 2 to 4 carbon atoms and having a double bond at an end thereof or a linear or branched alkynyl group having from 2 to 4 carbon atoms and having a triple bond at an end thereof.

(2) An energy storage device comprising a positive electrode, a negative electrode and a nonaqueous electrolytic solution having dissolved therein an electrolyte salt, the nonaqueous electrolytic solution being the nonaqueous electrolytic solution according to the item (1).

Advantageous Effects of Invention

The present invention provides a nonaqueous electrolytic solution that is capable of improving the electrochemical characteristics in a broad temperature range, particularly the low-temperature discharge properties after high-temperature storage of an energy storage device, and an energy storage device, such as a lithium battery, using the same.

DESCRIPTION OF EMBODIMENTS

Nonaqueous Electrolytic Solution

The nonaqueous electrolytic solution of the present invention comprises a nonaqueous solvent having dissolved therein an electrolyte salt, in which the nonaqueous solvent contains two or more kinds of cyclic carbonates selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate and 4-ethynyl-1,3-dioxolan-2-one, and the nonaqueous electrolytic solution further contains a cyclic acid anhydride represented by the general formula (I) having bonded thereto a side chain that has 3 or more carbon atoms and has a double bond or a triple bond at an end thereof (which may be hereinafter referred simply to as a cyclic acid anhydride represented by the general formula (I)) in an amount of from 0.01 to 10% by mass.

The reason why the nonaqueous electrolytic solution of the present invention is largely improved in the electrochemical characteristics in abroad temperature range, such as the low-temperature discharge properties after high-temperature storage, is not necessarily clear, but may be considered as follows.

The cyclic acid anhydride represented by the general formula (I) contained in the nonaqueous electrolytic solution of the present invention undergoes reductive decomposition on the negative electrode on the initial charging and forms a dense surface film having high heat resistance, which provides the effect of preventing the capacity after high-temperature storage from being worsened. However, the surface film derived from the cyclic acid anhydride represented by the general formula (I) tends to have a high resistance due to the double bond or the triple bond at the end of the side chain, and thus there is a problem that the low-temperature properties after high-temperature storage tends to be worsened.

By using two or more kinds of cyclic carbonates selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate and 4-ethynyl-1,3-dioxolan-2-one, in combination with the cyclic acid anhydride represented by the general formula (I), the decomposition products of the two or more kinds of different cyclic carbonates are introduced as components of the surface film along with the decomposition product of the cyclic acid anhydride represented by the general formula (I), and thereby the surface film is prevented from becoming dense excessively to provide a surface film having a low resistance. It is thus considered that the peculiar effect, i.e., the significant improvement of the low-temperature properties after high-temperature storage may be provided.

It has also been found that the aforementioned effect may be further enhanced when at least one kind selected from a cyclic carbonate that has a methyl group at the 4-position of ethylene carbonate, i.e., propylene carbonate, and a cyclic carbonate that has a carbon-carbon double bond or a carbon-carbon triple bond, i.e., vinylene carbonate, vinyl ethylene carbonate and 4-ethynyl-1,3-dioxolan-2-one, is used in addition to ethylene carbonate.

The cyclic acid anhydride contained in the nonaqueous electrolytic solution of the present invention is represented by the following general formula (I):

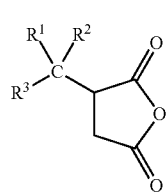

(I)

wherein $R^1$ and $R^2$ each independently represent a hydrogen atom, a halogen atom or an alkyl group having from 1 to 6 carbon atoms, at least one hydrogen atom of which may be substituted by a halogen atom; and $R^3$ represents a linear or branched alkenyl group having from 2 to 4 carbon atoms and having a double bond at an end thereof or a linear or branched alkynyl group having from 2 to 4 carbon atoms and having a triple bond at an end thereof.

Specific preferred examples of $R^1$ and $R^2$ in the general formula (I) include a hydrogen atom, a fluorine atom, a chlorine atom, a bromine atom, a methyl group, an ethyl group, a n-propyl group, a n-butyl group, a n-pentyl group, a n-hexyl group, an isopropyl group, a sec-butyl group, a tert-butyl group, a trifluoromethyl group and a 2,2,2-trifluoroethyl group.

$R^1$ and $R^2$ in the general formula (I) each more preferably represent a hydrogen atom, a halogen atom or an alkyl group having from 1 to 6 carbon atoms, further preferably a hydrogen atom, a fluorine atom, a methyl group or an ethyl group, and particularly preferably a hydrogen atom, a fluorine atom or a methyl group.

Specific preferred examples of $R^3$ in the general formula (I) include a vinyl group (an ethenyl group), an allyl group (a 2-propenyl group), an isopropenyl group (a 1-methylethenyl group), a 3-buten-1-yl group, a 1-propen-2-yl group, a 2-methyl-2-propen-1-yl group, an ethynyl group, a 2-propyne-1-yl group and a 3-butyn-1-yl group.

$R^3$ in the general formula (I) more preferably represent a linear or branched alkenyl group having from 2 or 3 carbon atoms and having a double bond at an end thereof or a linear or branched alkynyl group having from 2 or 3 carbon atoms and having a triple bond at an end thereof, further preferably a vinyl group, an isopropenyl group, an ethynyl group, a 2-propyne-1-yl group or a 3-butyn-1-yl group, and particularly preferably a vinyl group, an isopropenyl group or an ethynyl group.

Specific preferred examples of the cyclic acid anhydride represented by the general formula (I) include compounds having the following structural formulae 1 to 43.

1
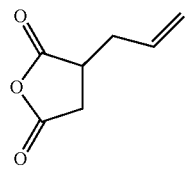

2
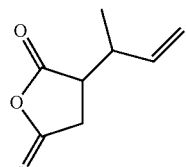

3
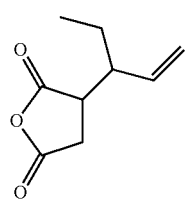

4
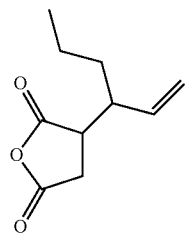

5

6
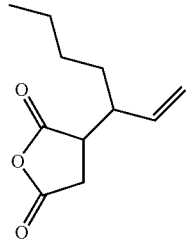

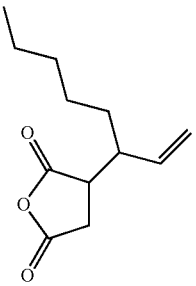

7
-continued
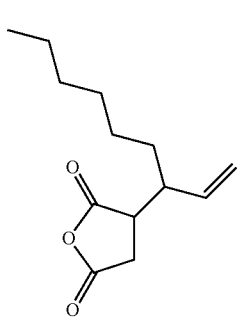
7
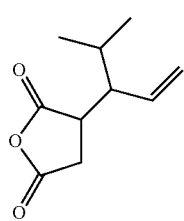
8
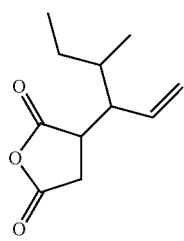
9
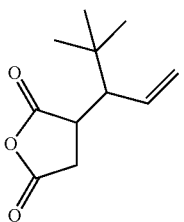
10
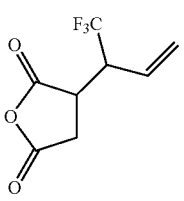
11
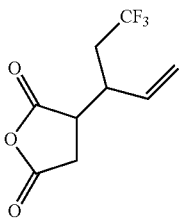
12
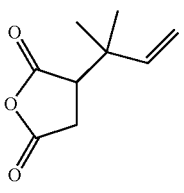
13
8
-continued
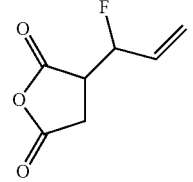
14
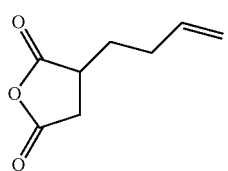
15
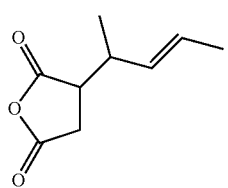
16
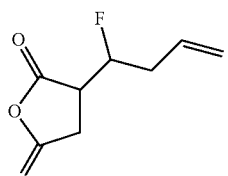
17
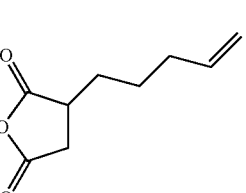
18
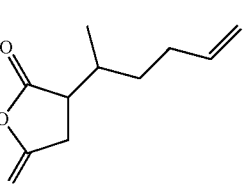
19
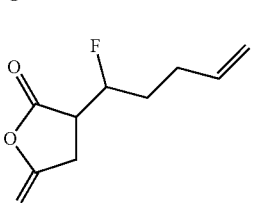
20
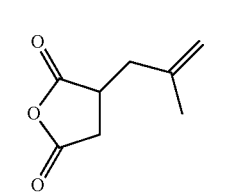
21

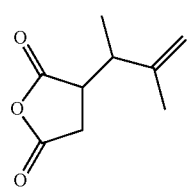 22
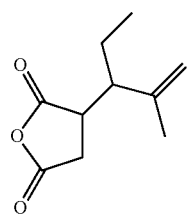 23
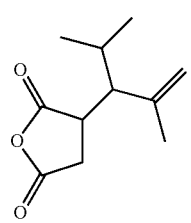 24
 25
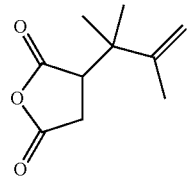 26
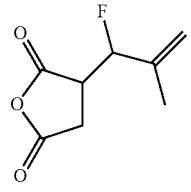 27
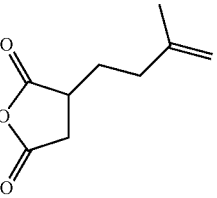 28
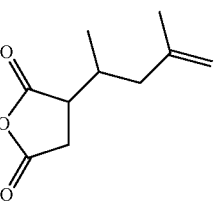 29
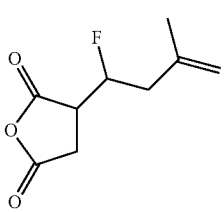 30
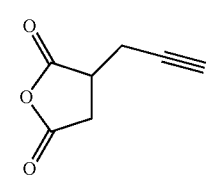 31
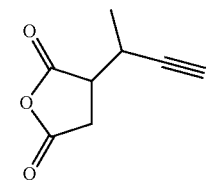 32
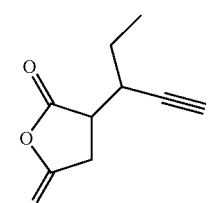 33
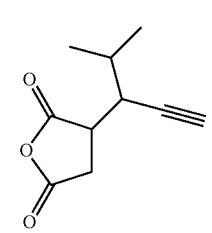 34
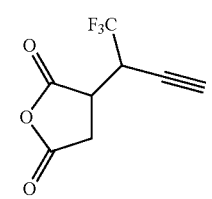 35
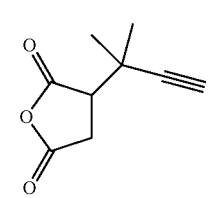 36
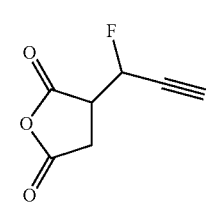 37

-continued

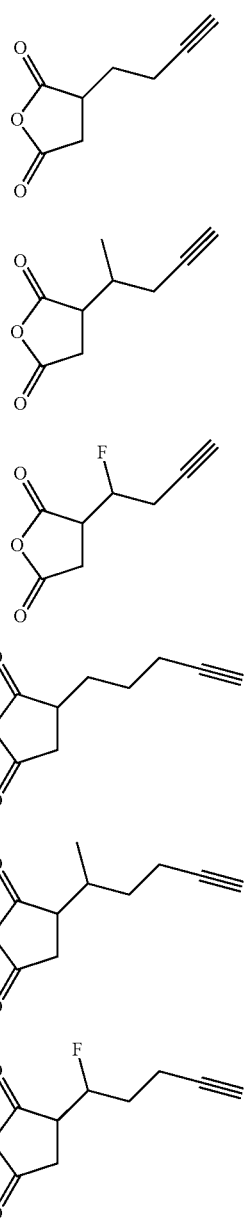

In the cyclic acid anhydride represented by the general formula (I), one or more kinds selected from compounds having the structural formula 1 (3-allyldihydrofuran-2,5-dione), the structural formula 2 (3-(3-methylallyl)dihydrofuran-2,5-dione), the structural formula 13 (3- (3,3-dimethylallyl)dihydrofuran-2,5-dione), the structural formula 21 (3-(2-methylallyl)dihydrofuran-2,5-dione), the structural formula 22 (3-(2,3-dimethylallyl)dihydrofuran-2,5-dione), the structural formula 26 (3-(2,3,3-trimethylallyl)dihydrofuran-2,5-dione), the structural formula 31 (3-(2-propyne-1-yl)dihydrofuran-2,5-dione), the structural formula 32 (3-(1-methyl-2-propyne-1-yl)dihydrofuran-2,5-dione) and the structural formula 36 (3-(1,1-dimethyl-2-propyne-1-yl)dihydrofuran-2,5-dione) are preferred, and one or more kinds selected from 3-(2-propyne-1-yl)dihydrofuran-2,5-dione (the structural formula 31), 3-(1-methyl-2-propyne-1-yl)dihydrofuran-2,5-dione (the structural formula 32) and 3-(1,1-dimethyl-2-propyne-1-yl)dihydrofuran-2,5-dione (the structural formula 36) are particularly preferred.

In the nonaqueous electrolytic solution of the present invention, the content of the cyclic acid anhydride represented by the general formula (I) is from 0.001 to 10% by mass in the nonaqueous electrolytic solution. When the content is 10% by mass or less, the surface film may be prevented from being formed excessively on the electrode, thereby preventing the low-temperature properties from being worsened, and when the content is 0.001% by mass or more, the surface film may be formed sufficiently, thereby improving the high-temperature storage properties. The content is preferably 0.05% by mass or more, and more preferably 0.2% by mass or more, in the nonaqueous electrolytic solution. The upper limit thereof is preferably 8% by mass or less, more preferably 5% by mass or less, and further preferably 2% by mass or less.

In the nonaqueous electrolytic solution of the present invention, a nonaqueous solvent, an electrolyte salt and an additive shown below may be combined to exhibit the peculiar effect, i.e., the synergistic improvement of the electrochemical characteristics in abroad temperature range, such as the low-temperature discharge properties after high-temperature storage.

Nonaqueous Solvent

Examples of the nonaqueous solvent used in the nonaqueous electrolytic solution of the present invention include two or more kinds of cyclic carbonates selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (both of which are referred generically to as DFEC), vinylene carbonate (VC), vinyl ethylene carbonate (VEC) and 4-ethynyl-1,3-dioxolan-2-one (EEC), and also include other cyclic carbonates, a linear ester, a lactone, an ether, an amide and a sulfone.

The nonaqueous solvent preferably contains only a cyclic carbonate, or both of a cyclic carbonate and a linear ester.

The term, linear ester, referred herein is used as a concept including a linear carbonate and a linear carboxylate ester.

Two or more kinds of cyclic carbonates are preferably contained as the cyclic carbonate for improving the low-temperature properties after high-temperature storage.

Particularly, in addition to ethylene carbonate, one or more kinds selected from a cyclic carbonate that has a methyl group at the 4-position of ethylene carbonate, i.e., propylene carbonate (PC), and a cyclic carbonate that has a carbon-carbon double bond or a carbon-carbon triple bond, i.e., vinylene carbonate (VC), vinyl ethylene carbonate (VEC) and 4-ethynyl-1,3-dioxolan-2-one (EEC), is preferably contained for further enhancing the low-temperature properties after storing at a high temperature. Furthermore, PC and VC are more preferred, and PC and VC are preferably contained for significantly improving the low-temperature properties after high-temperature storage.

The content of the cyclic carbonate that has a methyl group at the 4-position of ethylene carbonate (i.e., PC) is preferably 1% by volume or more, more preferably 4% by volume or more, and further preferably 8% by volume or more, based on the total volume of the nonaqueous solvent, and the upper limit thereof is preferably 50% by volume or less, more preferably 40% by volume or less, and further preferably 30% by volume or less. When the content is in the range, the stability of the surface film on high-temperature storage may be further advantageously improved without deterioration of the Li ion permeability at a low temperature.

The content of the cyclic carbonate that has a carbon-carbon double bond (i.e., VC and VEC) is preferably 0.07% by volume or more, more preferably 0.2% by volume or more, and further preferably 0.7% by volume or more, based on the total volume of the nonaqueous solvent, and the upper limit thereof is preferably 7% by volume or less, more preferably 4% by volume or less, and further preferably 2.5% by volume or less. When the content is in the range, the stability of the surface film on high-temperature storage may be further advantageously improved without deterioration of the Li ion permeability at a low temperature.

The cyclic carbonates are preferably used as a combination of two or more kinds thereof for improving the electrochemical characteristics in a broad temperature range, and more preferably used as a combination of three or more kinds thereof. Preferred examples of the combination of the cyclic carbonates include a combination of EC and PC, a combination of EC and VC, a combination of PC and VC, a combination of VC and FEC, a combination of EC and FEC, a combination of PC and FEC, a combination of FEC and DFEC, a combination of EC and DFEC, a combination of PC and DFEC, a combination of VC and DFEC, a combination of VC and EEC, a combination of EC and EEC, a combination of VEC and DFEC, a combination of EC, PC and VC, a combination of EC, PC and FEC, a combination of EC, VC and FEC, a combination of EC, VC and VEC, a combination of EC, VC and EEC, a combination of EC, PC and EEC, a combination of EC, EEC and FEC, a combination of PC, VC and FEC, a combination of EC, VC and DFEC, a combination of PC, VC and DFEC, a combination of EC, PC, VC and FEC, and a combination of EC, PC, VC and DFEC. Among the combinations, combinations, such as a combination of EC and PC, a combination of EC and VC, a combination of PC and FEC, a combination of EC, PC and VC, a combination of EC, PC and FEC, a combination of EC, VC and FEC, a combination of PC, VC and FEC and a combination of EC, PC, VC and FEC, are more preferred, combinations, such as a combination of EC and PC, a combination of EC, PC and VC, a combination of EC, VC and FEC, a combination of PC, VC and FEC, a combination of EC, VC and EEC, a combination of EC, PC and EEC, a combination of EC, EEC and FEC and a combination of EC, PC, VC and FEC, are further preferred, and a combination of EC and PC and a combination of EC, PC and VC are particularly preferred.

Preferred examples of the linear ester include one or more kinds selected from an asymmetric linear carbonate selected from methyl ethyl carbonate (MEC), methyl propyl carbonate (MPC), methyl isopropyl carbonate (MIPC), methyl butyl carbonate and ethyl propyl carbonate, asymmetric linear carbonate selected from dimethyl carbonate (DMC), diethyl carbonate (DEC), dipropyl carbonate and dibutyl carbonate, and a linear carboxylate ester selected from a pivalate ester, such as methyl pivalate (MPV), ethyl pivalate and propyl pivalate, methyl propionate, ethyl propionate, methyl acetate and ethyl acetate.

Among the linear esters, one or more kinds of symmetric linear carbonate selected from dimethyl carbonate (DMC), diethyl carbonate (DEC), dipropyl carbonate and dibutyl carbonate are preferred, and diethyl carbonate (DEC) are more preferred.

On using the linear ester, two or more kinds thereof are more preferably used in combination.

The linear ester preferably contains a pivalate ester, which is a tertiary carboxylate ester, since such an unexpected effect is provided that on forming the surface film on the negative electrode along with the cyclic acid anhydride having bonded thereto a side chain that has 3 or more carbon atoms and has a double bond or a triple bond at an end thereof of the present invention, the surface film is prevented from becoming dense excessively, and the lithium ion permeability is also enhanced, thereby further improving the electrochemical characteristics in abroad temperature range, and the linear ester particularly preferably contains methyl pivalate.

The content of the linear ester is not particularly limited, and is preferably from 30 to 90% by volume, and more preferably from 60 to 80% by volume, based on the total volume of the nonaqueous solvent. The content is preferably in the aforementioned range since when the content is 30% by volume or more, the effect of decreasing the viscosity of the nonaqueous electrolytic solution may be sufficiently obtained, and when the content is 90% by volume or less, the electroconductivity of the nonaqueous electrolytic solution may be sufficiently increased, and the electrochemical characteristics in a broad temperature range may be improved.

The proportion by volume of the pivalate ester occupying in the linear ester is preferably 5% by volume or more, more preferably 15% by volume or more, and further preferably 55% by volume or more. The upper limit thereof is preferably 100% by volume or less, more preferably 95% by volume or less, and further preferably 85% by volume or less.

The aforementioned ranges are preferred since the electrochemical characteristics in a broader temperature range may be improved.

The ratio of the cyclic carbonate and the linear ester (cyclic carbonate)/(linear ester) by volume is preferably from 10/90 to 70/30, more preferably from 15/85 to 50/50, and further preferably from 20/80 to 45/55, from the standpoint of the improvement of the electrochemical characteristics in abroad temperature range.

As the additional nonaqueous solvent, examples of the lactone include γ-butyrolactone, γ-valerolactone and α-angelicalactone, examples of the ether include a cyclic ether, such as tetrahydrofuran, 2-methyltetrahydrofuran, 1,3-dioxolane, 1,3-dioxane (DOX) and 1,4-dioxane, and a linear ether, such as 1,2-dimethoxyethane, 1,2-diethoxyethane and 1,2-dibutoxyethane, examples of the amide include dimethylformamide, and preferred examples of the sulfone include sulfolane.

The aforementioned nonaqueous solvents are generally used as a mixture for achieving the appropriate properties. Preferred examples of the combination include a combination of a cyclic carbonate and a linear carbonate, a combination of a cyclic carbonate and a linear carboxylate ester, a combination of a cyclic carbonate, a linear carbonate and a lactone, a combination of a cyclic carbonate, a linear carbonate and an ether, and a combination of a cyclic carbonate, a linear carbonate and a linear carboxylate ester.

Any other additive is preferably added to the nonaqueous electrolytic solution for improving the electrochemical characteristics in a broader temperature range.

Preferred specific examples of the other additive include a phosphate ester, such as trimethyl phosphate, tributyl phosphate, trioctyl phosphate, ethyl 2-(diethoxyphosphoryl) acetate, 2-propynyl 2-(diethoxyphosphoryl)acetate, ethyl 2-(diethoxyphosphoryl)-2-fluoroacetate and 2-(diethoxyphosphoryl)-2,2-difluoroacetate; an isocyanate, such as tetramethylenediisocyanate, hexamethylenediisocyanate and octamethylenediisocyanate; S=O bond-containing compound selected from a sultone, such as 1,3-propane sultone, 1,3-butane sultone, 2,4-butane sultone, 1,4-butane sultone, 2,2-dioxide-1,2-oxathiolane-4-yl acetate and 5,5-dimethyl-1,2-oxathiolane-4-one 2,2-dioxide, acyclic sulfite, such as ethylene sulfite, hexahydrobenzo[1,3,2]dioxathiolane-2-oxide (which may also be referred to as 1,2-cyclohexanediol cyclic sulfite) and 5-vinyl-hexahydro-1,3,2-benzodioxathiol-2-oxide, a sulfonate ester, such as 2-propynyl methanesulfonate, butan-1,4-diyl dimethanesulfonate, butyn-1,4-diyl dimethanesulfonate, pentan-1,5-diyl dimethanesulfonate, propan-1,2-diyl dimethanesulfonate, butan-2,3-diyl dimethanesulfonate, methylene methanedisulfonate, 2-trifluoromethylphenyl methanesulfonate, pentafluorophenyl methanesulfonate and methylene methanedisulfonate, a vinyl sulfone, such as divinyl sulfone, 1,2-bis(vinylsulfonyl)ethane and bis(2-vinylsulfonylethyl) ether, and the like; a linear carboxylic anhydride, such as acetic anhydride and propionic anhydride; a cyclic acid anhydride other than the cyclic anhydride represented by the general formula (I), such as succinic anhydride, maleic anhydride, glutaric anhydride and itaconic anhydride; and a cyclic phosphazene compound, such as methoxypentafluorocyclotriphosphazene, ethoxypentafluorocyclotriphosphazene, phenoxypentafluorocyclotriphosphazene and ethoxyheptafluorocyclotetraphosphazene.

Preferred specific examples of the other additive also include an aromatic compound having a branched alkyl group, such as cyclohexylbenzene, a fluorocyclohexylbenzene compound (e.g., 1-fluoro-2-cyclohexylbenzene, 1-fluoro-3-cyclohexylbenzene and 1-fluoro-4-cyclohexylbenzene), tert-butylbenzene, tert-amylbenzene, 1-fluoro-4-tert-butylbenzene and 1-fluoro-4-tert-alkylbenzene, and an aromatic compound, such as biphenyl, terphenyl (including o-, m- and p-forms), diphenyl ether, fluorobenzene, difluorobenzene (including o-, m- and p-forms), anisole, 2,4-difluoroanisole and a partial hydride of terphenyl (e.g., 1,2-dicyclohexylbenzene, 2-phenylbicyclohexyl, 1,2-diphenylcyclohexane and o-cyclohexylbiphenyl).

Among these, an aromatic compound containing a fluorine atom, a tert-alkyl group, or both of them is preferably contained since such an unexpected effect is provided that on forming the surface film on the negative electrode along with the cyclic acid anhydride represented by the general formula (I), the surface film is prevented from becoming dense excessively, and the lithium ion permeability is also enhanced, thereby improving the electrochemical characteristics in a broader temperature range.

Preferred examples of the aromatic compound containing a fluorine atom, a tert-alkyl group, or both of them include a fluorocyclohexylbenzene compound (e.g., 1-fluoro-2-cyclohexylbenzene, 1-fluoro-3-cyclohexylbenzene and 1-fluoro-4-cyclohexylbenzene), fluorobenzene, difluorobenzene (including o-, m- and p-compounds), 2,4-difluoroanisole, tert-butylbenzene, tert-amylbenzene, 1-fluoro-4-tert-butylbenzene and 1-fluoro-4-tert-alkylbenzene. Among these, one or more kinds selected from 1-fluoro-4-cyclohexylbenzene, fluorobenzene, difluorobenzene (including o-, m- and p-forms), tert-butylbenzene, tert-amylbenzene and 1-fluoro-4-tert-butylbenzene are preferred, one or more kinds selected from fluorobenzene, difluorobenzene (including o-, m- and p-forms), tert-amylbenzene and 1-fluoro-4-tert-butylbenzene are more preferred, and an aromatic compound containing a fluorine atom and a tert-alkyl group, such as 1-fluoro-4-tert-butylbenzene and 1-fluoro-4-tert-alkylbenzene, is particularly preferred.

The content of the aromatic compound containing a fluorine atom, a tert-alkyl group, or both of them is preferably from 0.1 to 15% by mass in the nonaqueous electrolytic solution. When the content is in the range, the surface film is sufficiently formed without the thickness thereof becoming too large, thereby further improving the electrochemical characteristics in abroad temperature range. The content is more preferably 0.5% by mass or more, and further preferably 1% by mass or more, in the nonaqueous electrolytic solution, and the upper limit thereof is preferably 13% by mass or less.

When one or more kinds selected from a phosphate ester compound, an isocyanate, a sultone compound, a sulfonate ester and a nitrile are preferably contained since such an unexpected effect is provided that on forming the surface film on the negative electrode along with the cyclic acid anhydride having bonded thereto a side chain that has 3 or more carbon atoms and has a double bond or a triple bond at an end thereof of the present invention, the surface film is prevented from becoming dense excessively, and the lithium ion permeability is also enhanced, thereby further improving the electrochemical characteristics in a broader temperature range.

Preferred examples of the phosphate ester compound include ethyl 2-(diethoxyphosphoryl)acetate, 2-propynyl 2-(diethoxyphosphoryl)acetate, ethyl 2-(diethoxyphosphoryl)-2-fluoroacetate and 2-(diethoxyphosphoryl)-2,2-difluoroacetate, and among these, 2-propynyl 2-(diethoxyphosphoryl)acetate, ethyl 2-(diethoxyphosphoryl)-2-fluoroacetate and 2-(diethoxyphosphoryl)-2,2-difluoroacetate are preferred.

Preferred examples of the isocyanate include a diisocyanate, such as tetramethylenediisocyanate, hexamethylenediisocyanate and octamethylenediisocyanate, and among these, hexamethylenediisocyanate is preferred.

Examples of the sultone compound include 1,3-propane sultone, 2,4-butane sultone, 2,2-dioxide-1,2-oxathiolane-4-yl acetate and 5,5-dimethyl-1,2-oxathiolane-4-one 2,2-dioxide, and among these, 1,3-propane sultone, 2,2-dioxide-1,2-oxathiolane-4-yl acetate and 5,5-dimethyl-1,2-oxathiolane-4-one 2,2-dioxide are preferred.

Preferred examples of the sulfonate ester include 2-propynyl methanesulfonate, butyn-1,4-diyl dimethanesulfonate, pentan-1,5-diyl dimethanesulfonate, butan-2,3-diyl dimethanesulfonate, methylene methanedisulfonate, pentafluorophenyl methanesulfonate and methylene methanedisulfonate, and among these, 2-propynyl methanesulfonate, butyn-1,4-diyl dimethanesulfonate and pentafluorophenyl methanesulfonate are preferred.

Examples of the nitrile include acetonitrile, propionitrile, succinonitrile, glutaronitrile, adiponitrile and pimelonitrile. A dinitrile, such as succinonitrile, glutaronitrile, adiponitrile and pimelonitrile, are preferred, succinonitrile, adiponitrile and pimelonitrile are more preferred, and adiponitrile and pimelonitrile are further preferred.

The content of one or more kinds selected from a phosphate ester compound, an isocyanate, a sultone compound, a sulfonate ester and a nitrile is preferably from 0.01 to 5% by mass in the nonaqueous electrolytic solution. When the content is in the range, the surface film is sufficiently formed without the thickness thereof becoming too large, thereby further improving the electrochemical characteristics in a broad temperature range. The content is more preferably 0.05% by mass or more, further preferably 0.1% by mass or more, and particularly preferably 0.3% by mass or more, in the nonaqueous electrolytic solution, and the upper limit thereof is more preferably 3% by mass or less, and further preferably 2% by mass or less.

The content of the other additive is preferably 0.05% by mass or more, and more preferably 0.2% by mass or more, from the standpoint of the improvement of the electrochemical characteristics in a broad temperature range. The upper limit thereof is preferably 8% by mass or less, more preferably 5% by mass or less, and particularly preferably 3% by mass or less.

Electrolyte Salt

Preferred examples of the electrolyte salt used in the present invention include lithium salts and onium salts shown below.

Lithium Salt

Preferred examples of the lithium salt include an inorganic lithium salt, such as $LiPF_6$, $LiPO_2F_2$, $Li_2PO_3F$, $LiBF_4$, $LiClO_4$ and $LiSO_3F$; a lithium salt having a linear fluoroalkyl group, such as $LiN(SO_2F)_2$, $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_7)$; a lithium salt having a cyclic fluoroalkylene chain, such as $(CF_2)_2(SO_2)_2NLi$ and $(CF_2)_3(SO_2)_2NLi$; and a lithium salts having an oxalate complex as an anion, such as lithium bis[oxalate-O,O']borate, lithium difluoro[oxalate-O,O']borate, lithium difluorobis[oxalate-O,O']phosphate and lithium tetrafluoro[oxalate-O,O']phosphate, and one or more kinds of these compounds may be used as a mixture.

Among those, one or more kinds selected from $LiPF_6$, $LiPO_2F_2$, $Li_2PO_3F$, $LiBF_4$, $LiSO_3F$, $LiN(SO_2CF_3)_2$, $LiN(SO_2C_2F_5)_2$, $LiN(SO_2F)_2$, lithium difluorobis[oxalate-O,O']phosphate and lithium tetrafluoro[oxalate-O,O']phosphate are preferred, and one or more kinds selected from $LiPF_6$, $LiPO_2F_2$, $LiBF_4$, $LiN(SO_2CF_3)_2$, $LiN(SO_2F)_2$ and lithium difluorobis[oxalate-O,O']phosphate are more preferred.

The concentration of the lithium salt is generally preferably 0.3 M or more, more preferably 0.7 M or more, and further preferably 1.1 M or more, with respect to the nonaqueous solvent. The upper limit thereof is preferably 2.5 M or less, more preferably 2.0 M or less, and further preferably 1.6 M or less.

Preferred examples of the combination of the lithium salts include cases where the nonaqueous electrolytic solution contains $LiPF_6$ and also contains one or more kinds of a lithium salt selected from $LiPO_2F_2$, $LiBF_4$, $LiN(SO_2CF_3)_2$, $LiN(SO_2F)_2$ and lithium difluorobis[oxalate-O,O']phosphate.

The proportion of the lithium salt other than $LiPF_6$ in the nonaqueous solvent is preferably 0.001 M or more since the improvement of the electrochemical characteristics at a high temperature may be facilitated, and is preferably 0.5M or less since the improvement of the electrochemical characteristics at a high temperature may be prevented from being deteriorated. The proportion is more preferably 0.01 M or more, further preferably 0.03 M or more, and particularly preferably 0.04 M or more. The upper limit thereof is more preferably 0.4 M or less, and further preferably 0.2 M or less.

Onium Salt

Preferred examples of the onium salt include salts containing a combination of an onium cation and an anion shown below.

Preferred specific examples of the onium cation include a tetramethylammonium cation, an ethyltrimethylammonium cation, a diethyldimethylammonium cation, a triethylmethylammonium cation, a tetraethylammonium cation, an N,N-dimethylpyrrolidinium cation, an N-ethyl-N-methylpyrrolidinium cation, an N,N-diethylpyrrolidinium cation, a spiro-(N,N')-bipyrrolidinium cation, an N,N'-dimethylimidazolinium cation, an N-ethyl-N'-methylimidazolinium cation, an N,N'-diethylimidazolinium cation, an N,N'-dimethylimidazolinium cation, an N-ethyl-N'-methylimidazolinium cation and an N,N'-diethylimidazolinium cation.

Preferred specific examples of the anion include a $PF_6$ anion, a $BF_4$ anion, a $ClO_4$ anion, an $AsF_6$ anion, a $CF_3SO_3$ anion, an $N(CF_3SO_2)_2$ anion and an $N(C_2F_5SO_2)_2$ anion.

The electrolyte salts may be used solely or as a combination of two or more kinds thereof.

Production of Nonaqueous Electrolytic Solution

The nonaqueous electrolytic solution of the present invention may be produced, for example, by mixing the above-mentioned nonaqueous solvents, adding the above-mentioned electrolyte salt, and further adding thereto the cyclic acid anhydride represented by the general formula (I) to the resulting nonaqueous electrolytic solution.

At this time, the nonaqueous solvent used and the compounds added to the nonaqueous electrolytic solution are preferably purified previously to reduce as much as possible the content of impurities, in such an extent that does not extremely deteriorate the productivity.

The nonaqueous electrolytic solution of the present invention may be used in first to fourth energy storage devices shown below, in which the nonaqueous electrolytic solution may be used as the nonaqueous electrolyte not only in the form of a liquid but also in the form of gel. The nonaqueous electrolytic solution of the present invention may also be used for a solid polymer electrolyte. Among these, the nonaqueous electrolytic solution is preferably used in the first energy storage device using a lithium salt as the electrolyte salt (i.e., for a lithium battery) and in the fourth energy storage device (i.e., for a lithium ion capacitor), more preferably used in a lithium battery, and most suitably used in a lithium secondary battery.

First Energy Storage Device (Lithium Battery)

The lithium battery of the present invention is a generic name for a lithium primary battery and a lithium secondary battery. In the present specification, the term, lithium secondary battery, is used as a concept that includes a so-called lithium ion secondary battery. The lithium battery of the present invention contains a positive electrode, a negative electrode and the aforementioned nonaqueous electrolytic solution containing an electrolyte salt dissolved in a nonaqueous solvent. Other constitutional members used than the nonaqueous electrolytic solution, such as the positive electrode and the negative electrode, are not particularly limited.

For example, examples of the positive electrode active material used for a lithium secondary battery include a complex metal oxide of lithium containing one or more selected from cobalt, manganese and nickel. The positive electrode active materials may be used solely or as a combination of two or more kinds thereof.

Examples of the lithium complex metal oxide include one or more selected from $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_2Mn_{3/2}O_4$, $LiCo_{0.98}Mg_{0.02}O_2$ and the like. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle property, and for enabling the use at a charge potential of 4.3 V or more, a part of the lithium complex metal oxide may be substituted with other elements. For example, a part of cobalt, manganese and nickel may be substituted with at least one element selected from Sn, Mg, Fe, Ti, Al, Zr, Cr, V, Ga, Zn, Cu, Bi, Mo, La and the like, a part of O may be substituted with S or F, or the oxide may be coated with a compound containing any of such other elements.

Among those, a lithium complex metal oxide that can be used at a charge potential of the positive electrode in a fully-charged state of 4.3 V or more based on Li, such as one or more selected from $LiCoO_2$, $LiMn_2O_4$ and $LiNiO_2$, is preferred, and a lithium complex metal oxide that can be used at 4.4 V or more, such as a solid solution of $LiCo_{1-x}$ $M_xO_2$ (where M represents one or more elements selected from Sn, Mg, Fe, Ti, Al, Zr, Cr, V, Ga, Zn and Cu, $0.001 \leq x \leq 0.05$), $LiCo_{1/3}Ni_{1/3}Mn_{1/3}O_2$, $LiNi_{1/2}Mn_{3/2}O_4$ or $Li_2MnO_3$ with $LiMO_2$ (where M represents a transition metal, such as Co, Ni, Mn and Fe) is more preferred. The use of the lithium complex metal oxide capable of acting at a high charge voltage may worsen the electrochemical characteristics in a broad temperature range due to the reaction with the electrolytic solution on charging, but in the lithium secondary battery of the present invention, the electrochemical characteristics may be prevented from worsening.

In particular, a battery with a positive electrode containing Mn tends to have an increased resistance due to elution of Mn ions from the positive electrode, thereby providing the tendency of worsening the electrochemical characteristics in a broad temperature range. However, it is preferred that the lithium secondary battery of the present invention can prevents the electrochemical characteristics from worsening.

Furthermore, a lithium-containing olivine-type phosphate may also be used as the positive electrode active material. A lithium-containing olivine-type phosphate containing one or more kinds selected from iron, cobalt, nickel and manganese is particularly preferred, and specific examples thereof include one or more kinds selected from $LiFePO_4$, $LiCoPO_4$, $LiNiPO_4$, $LiMnPO_4$, etc.

The lithium-containing olivine-type phosphate may be partly substituted with another element. Iron, cobalt, nickel and manganese therein may be partly substituted with one or more elements selected from Co, Mn, Ni, Mg, Al, B, Ti, V, Nb, Cu, Zn, Mo, Ca, Sr, W and Zr, or the phosphate may be coated with a compound containing any of these other elements or with a carbon material. Among those, $LiFePO_4$ and $LiMnPO_4$ are preferred.

The lithium-containing olivine-type phosphate may be used, for example, in combination with the above-mentioned positive electrode active material.

Examples of the positive electrode for a lithium primary battery include oxides or chalcogen compounds of one or more kinds of metal elements, such as CuO, $Cu_2O$, $Ag_2O$, $Ag_2CrO_4$, CuS, $CuSO_4$, $TiO_2$, $TiS_2$, $SiC_2$, SnO, $V_2O_5$, $V_6O_{12}$, $VO_x$, $Nb_2O_5$, $Ei_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$ and CoO, a sulfur compound, such as $SO_2$ and $SOCl_2$, and a carbon fluoride (graphite fluoride) represented by a general formula $(CF_x)_n$. Among those, one or more kinds selected from $MnO_2$, $V_2O_5$ and graphite fluoride are preferred.

The electroconductive agent of the positive electrode is not particularly limited as far as it is an electron-conductive material that does not undergo chemical change. Examples thereof include graphite, such as natural graphite (e.g., flaky graphite) and artificial graphite, and carbon black, such as acetylene black, Ketjen black, channel black, furnace black, lamp black and thermal black. The graphite and the carbon black may be appropriately used as a mixture. The amount of the electroconductive agent added to the positive electrode mixture is preferably from 1 to 10% by mass, and more preferably from 2 to 5% by mass.

The positive electrode may be formed in such a manner that the positive electrode active material is mixed with an electroconductive agent, such as acetylene black and carbon black, and then mixed with a binder, such as polytetrafluoroethylene (PTFE), polyvinylidene fluoride (PVDF), a styrene-butadiene copolymer (SBR), an acrylonitrile-butadiene copolymer (NBR), carboxymethyl cellulose (CMC) and an ethylene-propylene-diene terpolymer, to which a high-boiling point solvent, such as 1-methyl-2-pyrrolidone is added, followed by kneading, to provide a positive electrode mixture, and the positive electrode mixture is coated on a collector, such as an aluminum foil and a stainless steel lath plate, dried, shaped under pressure, and then heat-treated in vacuum at a temperature of approximately from 50 to 250° C. for approximately 2 hours.

The density of the positive electrode except the collector is generally 1.5 g/cm$^3$ or more, and for further increasing the capacity of the battery, the density is preferably 2 g/cm$^3$ or more, more preferably 3 g/cm$^3$ or more, and further preferably 3.6 g/cm$^3$ or more. The upper limit thereof is preferably 4 g/cm$^3$ or less.

Examples of the negative electrode active material for a lithium secondary battery include one or more kinds selected from lithium metal, a lithium alloy, a carbon material capable of absorbing and releasing lithium (graphitizable carbon, non-graphitizable carbon having a lattice (002) spacing of 0.37 nm or more, and graphite having a lattice (002) spacing of 0.34 nm or less, etc.), tin (elementary substance), a tin compound, silicon (elementary substance), a silicon compound, and a lithium titanate compound, such as $Li_4Ti_5O_{12}$.

Among those, in the ability of absorbing and releasing lithium ions, a high-crystalline carbon material, such as artificial graphite and natural graphite, is further preferred, and a carbon material having a graphite-type crystal structure having a lattice (002) spacing ($d_{002}$) of 0.340 nm (nanometers) or less, and particularly from 0.335 to 0.337 nm, is particularly preferred.

Artificial graphite particles having a bulky structure containing plural flattened graphite fine particles that are aggregated or bonded non-parallel to each other, or graphite particles produced through a spheroidizing treatment of flaky natural graphite particles by applying thereto repeated mechanical action, such as compression force, friction force or shear force may be used, and thereby the ratio I(110)/I(004) of the peak intensity I(110) of the (110) plane to the peak intensity I(004) of the (004) plane of the graphite crystal obtained in X-ray diffractometry of a negative electrode sheet that is formed by pressing to provide a density of the negative electrode except the collector of 1.5 g/cm$^3$ or more is preferably 0.01 or more, more preferably 0.05 or more, and further preferably 0.1 or more, since the electrochemical characteristics may be improved in a broader temperature range. The upper limit thereof is preferably 0.5 or less, and more preferably 0.3 or less, since there are cases where the crystallinity may be deteriorated to lower the discharge capacity of the battery due to excessive treatment.

The high-crystalline carbon material (core material) is preferably used since the material that is coated with another carbon material having lower crystallinity than the core material improves the electrochemical characteristics in a broad temperature range. The crystallinity of the carbon material in the coating may be confirmed through TEM.

The use of the high-crystalline carbon material tends to worsen the electrochemical characteristics at a low temperature or a high temperature due to increase of the interfacial resistance caused by the reaction thereof with the nonaqueous electrolytic solution on charging, but the lithium secondary battery of the present invention provides good electrochemical characteristics in abroad temperature range.

Examples of the metal compound capable of absorbing and releasing lithium as a negative electrode active material include compounds containing at least one metal element of Si, Ge, Sn, Pb, P, Sb, Bi, Al, Ga, In, Ti, Mn, Fe, Co, Ni, Cu, Zn, Ag, Mg, Sr, Ba and the like. The metal compound may be in any form including an elementary substance, an alloy, an oxide, a nitride, a sulfide, a boride and an alloy with lithium, and any of an elementary substance, an alloy, an oxide and an alloy with lithium is preferred since the battery capacity may be increased thereby. Among these, compounds containing at least one element selected from Si, Ge and Sn is preferred, and compounds containing at least one element selected from Si and Sn are particularly preferred, since the battery capacity may be increased thereby.

The negative electrode may be formed in such a manner that the same electroconductive agent, binder and high-boiling point solvent as in the formation of the above-mentioned positive electrode are used and kneaded to provide a negative electrode mixture, and the negative electrode mixture is then applied onto a collector, such as a copper foil, dried, shaped under pressure, and then heat-treated in vacuum at a temperature of approximately from 50 to 250° C. for approximately 2 hours.

The density of the negative electrode except the collector may be generally 1.1 g/cm$^3$ or more, and for further increasing the battery capacity, the density is preferably 1.5 g/cm$^3$ or more, and more preferably 1.7 g/cm$^3$ or more. The upper limit thereof is preferably 2 g/cm$^3$ or less.

Examples of the negative electrode active material for a lithium primary battery include lithium metal and a lithium alloy.

The structure of the lithium battery is not particularly limited, and may be a coin-type battery, a cylinder-type battery, a square-shaped battery, a laminate-type battery or the like, each having a single-layered or multi-layered separator.

The separator for the battery is not particularly limited, and examples thereof used include a single-layer or laminated micro-porous film of polyolefin, such as polypropylene and polyethylene, as well as a woven fabric, a nonwoven fabric, etc.

The lithium secondary battery of the present invention has excellent electrochemical characteristics in a broad temperature range even when the final charging voltage is 4.2 V or more, and particularly 4.3 V or more, and furthermore the characteristics thereof are still good even at 4.4 V or more. The final discharging voltage may be generally 2.8 V or more, and further 2.5 V or more, and the discharging final voltage of the lithium secondary battery of the present invention may be 2.0 V or more. The electric current is not particularly limited, and in general, the battery may be used within a range of from 0.1 to 30 C. The lithium battery of the present invention may be charged and discharged at a temperature of from −40 to 100° C., and preferably from −10 to 80° C.

In the present invention, as a countermeasure against the increase in the internal pressure of the lithium battery, such a method may be employed that a safety valve is provided in the battery cap, and a cutout is provided in the battery component, such as the battery can and the gasket. As a safety countermeasure against overcharging, a circuit cut-off mechanism capable of detecting the internal pressure of the battery to cut off the current may be provided in the battery cap.

Second Energy Storage Device (Electric Double-layer Capacitor)

The energy storage device stores energy by utilizing the electric double layer capacitance in the interface between the electrolytic solution and the electrode. One example thereof of the present invention is an electric double layer capacitor. The most typical electrode active material used in the energy storage device is active carbon. The double layer capacitance increases almost in proportion to the surface area.

Third Energy Storage Device

The energy storage device stores energy by utilizing the doping/dedoping reaction of the electrode therein. Examples of the electrode active material used in the energy storage device include a metal oxide, such as ruthenium oxide, iridium oxide, tungsten oxide, molybdenum oxide and copper oxide, a π-conjugated polymer, such as polyacene and a polythiophene derivative. A capacitor that uses the electrode active material is capable of storing energy along with the doping/dedoping reaction at the electrode therein.

Fourth Energy Storage Device (Lithium Ion Capacitor)

The energy storage device stores energy by utilizing the lithium ion intercalation into a carbon material, such as graphite, as the negative electrode. The energy storage device may also be referred to as a lithium ion capacitor (LIC). Examples of the positive electrode include one utilizing an electric double layer between an active carbon electrode and an electrolytic solution therein, and one utilizing doping/dedoping reaction of a π-conjugated polymer electrode. The electrolytic solution contains at least a lithium salt, such as LiPF$_6$.

EXAMPLE

Examples of the electrolytic solution of the present invention will be described below, but the present invention is not limited to the examples.

Examples 1 to 23 and Comparative Examples 1 to 5

Production of Lithium Ion Secondary Battery

94% by mass of LiNi$_{1/3}$Mn$_{1/3}$Co$_{1/3}$O$_2$ and 3% by mass of acetylene black (electroconductive agent) were mixed, and added to and mixed with a solution, which was prepared by dissolving 3% by mass of polyvinylidene fluoride (binder) in 1-methyl-2-pyrrolidone in advance, thereby preparing a positive electrode mixture paste. The positive electrode mixture paste was applied onto one surface of an aluminum foil (collector), then dried, processed under pressure, and punched out into a predetermined size, thereby producing a positive electrode sheet. The density of the positive electrode except for the collector was 3.6 g/cm$^3$.

95% by mass of artificial graphite (d$_{002}$=0.335 nm, negative electrode active material) was added to and mixed with a solution, which was previously prepared by dissolving 5% by mass of polyvinylidene fluoride (binder) in 1-methyl-2-pyrrolidone in advance, thereby preparing a negative electrode mixture paste. The negative electrode mixture paste was applied onto one surface of a copper foil (collector), dried, processed under pressure, and punched out into a predetermined size, thereby producing a negative electrode sheet. The density of the part of the negative electrode except the collector was 1.5 g/cm$^3$. The electrode sheet was analyzed by X-ray diffractometry, and the ratio I(110)/I(004) of the peak intensity I(110) of the (110) plane to the peak intensity 1(004) of the (004) plane of the graphite crystal was 0.1.

The positive electrode sheet, a micro-porous polyethylene film separator and the negative electrode sheet were laminated in this order, and the nonaqueous electrolytic solution having the composition shown in Table 1 (in which the cyclic acid anhydride of Examples 1 to 6 and 10 to 23 was 3-allyldihydrofuran-2,5-dione, the cyclic acid anhydride of Example 7 was 3-(3-methylallyl)dihydrofuran-2,5-dione, the cyclic acid anhydride of Example 8 was 3-(2-methylal-lyl)dihydrofuran-2,5-dione, and the cyclic acid anhydride of Example 9 was 3-(2-propyne-1-yl)dihydrofuran-2,5-dione) was added thereto to produce a 2032 coin-type battery.

Evaluation of Low-Temperature Property after High-Temperature Charged Storage (i) Initial Discharge Capacity In a thermostatic chamber kept at 25° C., the coin-type battery produced according to the aforementioned method was charged up to a final voltage of 4.3 V over 3 hours with a constant current of 1 C and a constant voltage, then the temperature of the thermostat chamber was lowered to 0° C., and the battery was discharged under a constant current of 1 C to a final voltage of 2.75 V. The initial discharge capacity at 0° C. was measured.

(ii) High-Temperature Charged Storage Test

Subsequently, in a thermostatic chamber at 85° C., the coin-type battery was charged up to a final voltage of 4.2 V over 3 hours with a constant current of 1 C and a constant voltage, and then stored for 3 days while kept at 4.3 V. Thereafter, the battery was placed in a thermostatic chamber at 25° C., and once discharged under a constant current of 1 C to a final voltage of 2.75 V.

(iii) Discharge Capacity after High-Temperature Charged Storage

Further thereafter, the discharge capacity at 0° C. after the high-temperature charged storage (after the high-temperature storage at 85° C. after fully charged as in (ii)) was measured in the same manner as in the measurement of the initial discharge capacity.

(iv) Low-Temperature Property after High-Temperature Charged Storage

The low-temperature property after the high-temperature charged storage is determined based on the 0° C. discharge capacity retention rate shown below.

0° C. Discharge capacity retention rate after high-temperature charged storage(%)=(discharge capacity at 0° C. after high-temperature charged storage/initial discharge capacity at 0° C.)×100

The conditions for producing the battery and the battery properties are shown in Tables 1 to 3.

TABLE 1

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 1 | 1.1M LiPF$_6$ EC/PC/DEC (5/25/70) | 3-allyldihydrofuran-2,5-dione | 0.5 | 73 |
| Example 2 | 1.1M LiPF$_6$ EC/PC/VC/DEC (5/23/2/70) | 3-allyldihydrofuran-2,5-dione | 0.1 | 72 |
| Example 3 | 1.1M LiPF$_6$ EC/PC/VC/DEC (5/23/2/70) | 3-allyldihydrofuran-2,5-dione | 0.5 | 78 |
| Example 4 | 1.1M LiPF$_6$ EC/PC/VC/DEC (5/23/2/70) | 3-allyldihydrofuran-2,5-dione | 1 | 77 |
| Example 5 | 1.1M LiPF$_6$ EC/PC/VC/DEC (5/23/2/70) | 3-allyldihydrofuran-2,5-dione | 5 | 76 |

TABLE 1-continued

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 6 | 1.1M LiPF$_6$ EC/PC/VC/DEC (23/5/2/70) | 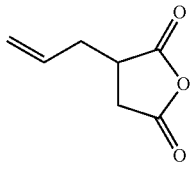 | 0.5 | 76 |
| Example 7 | 1.1M LiPF$_6$ EC/PC/VC/DEC (5/23/2/70) | 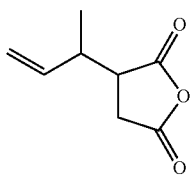 | 0.5 | 74 |
| Example 8 | 1.1M LiPF$_6$ EC/PC/VC/DEC (5/23/2/70) | 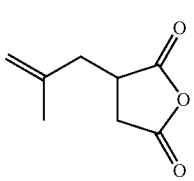 | 0.5 | 75 |
| Example 9 | 1.1M LiPF$_6$ EC/PC/VC/DEC (5/23/2/70) | 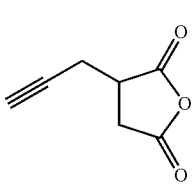 | 0.5 | 79 |
| Example 10 | 1.1M LiPF$_6$ EC/PC/VC/DEC/MPV (5/23/2/30/40) | 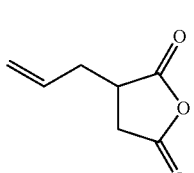 | 0.5 | 81 |
| Example 11 | 1.1M LiPF$_6$ EC/PC/VC/DEC/MPV (5/23/2/65/5) | 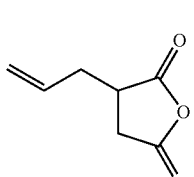 | 0.5 | 83 |
| Comparative Example 1 | 1.1M LiPF$_6$ EC/DEC (30/70) | 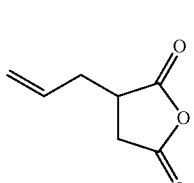 | 0.5 | 65 |
| Comparative Example 2 | 1.1M LiPF$_6$ EC/PC/DEC (5/25/70) | 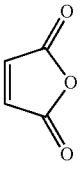 | 0.5 | 61 |

TABLE 1-continued

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Comparative Example 3 | 1.1M LiPF$_6$ EC/PC/DEC (5/25/70) | (allyl-substituted maleic anhydride structure) | 0.5 | 63 |
| Comparative Example 4 | 1.1M LiPF$_6$ EC/PC/DEC (5/25/70) | (vinyl-substituted succinic anhydride structure) | 0.5 | 62 |
| Comparative Example 5 | 1.1M LiPF$_6$ EC/PC/DEC (5/25/70) | (2-butenyl-substituted succinic anhydride structure) | 0.5 | 63 |

TABLE 2

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 12 | 1.1M LiPF$_6$ + 0.1M LiN(SO$_2$CF$_3$)$_2$ EC/VC/DEC (28/2/70) | (allyl-substituted succinic anhydride structure) | 0.5 | 80 |
| Example 13 | 1.1M LiPF$_6$ EC/VC/DEC (28/2/70) + fluorobenzene 3 wt % | (allyl-substituted succinic anhydride structure) | 0.5 | 86 |
| Example 14 | 1.1M LiPF$_6$ EC/VC/DEC (28/2/70) + fluorobenzene 12 wt % | (allyl-substituted succinic anhydride structure) | 0.5 | 84 |
| Example 15 | 1.1M LiPF$_6$ EC/VC/DEC (28/2/70) + 1-fluoro-4-tert-butylbenzene 3 wt % | (allyl-substituted succinic anhydride structure) | 0.5 | 88 |

TABLE 2-continued

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 16 | 1.1M LiPF$_6$ EC/VC/DEC (28/2/70) + adiponitrile 0.5 wt % | 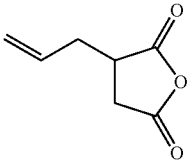 | 0.5 | 85 |
| Example 17 | 1.1M LiPF$_6$ EC/VC/DEC (28/2/70) + adiponitrile 2 wt % | 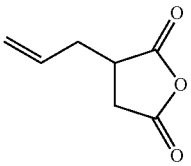 | 0.5 | 84 |
| Comparative Example 1 | 1.1M LiPF$_6$ EC/DEC (30/70) | 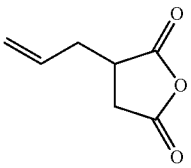 | 0.5 | 65 |

TABLE 3

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 18 | 1.1M LiPF$_6$ EC/PC/EEC/DEC (5/23/2/70) | 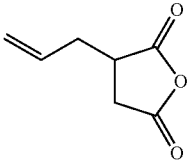 | 0.5 | 81 |
| Example 19 | 1.1M LiPF$_6$ EC/VC/DEC/DOX (28/2/69/1) | 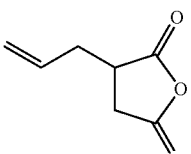 | 0.5 | 80 |
| Example 20 | 1.1M LiPF$_6$ EC/VC/DEC (29/2/70) + 2-propynyl 2-(diethoxyphosphoryl) acetate 1 wt % | 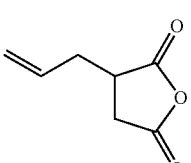 | 0.5 | 83 |
| Example 21 | 1.1M LiPF$_6$ EC/VC/DEC (28/2/70) + 5,5-dimethyl- 1,2-oxathiolane-4-one 2,2-dioxide 1 wt % | 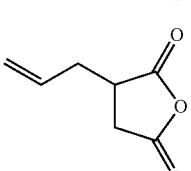 | 0.5 | 82 |

TABLE 3-continued

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 22 | 1.1M LiPF$_6$ EC/VC/DEC (28/2/70) + butyn-1,4-diyl dimethanesulfonate 1 wt % | 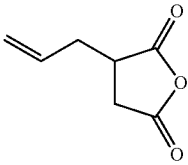 | 0.5 | 83 |
| Example 23 | 1.1M LiPF$_6$ + 0.1M LiPO$_2$F$_2$ EC/VC/DEC (28/2/70) | 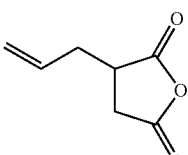 | 0.5 | 84 |
| Comparative Example 1 | 1.1M LiPF$_6$ EC/DEC (30/70) | 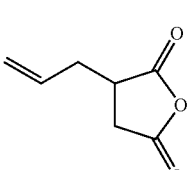 | 0.5 | 65 |

Example 24 and Comparative Example 6

A negative electrode sheet was produced by changing the negative electrode active material used in Example 1 and Comparative Example 1 to silicon (elementary substance) (negative electrode active material). 80% by mass of silicon (elementary substance) and 15% by mass of acetylene black (electroconductive agent) were mixed, and added to and mixed with a solution, which was prepared by dissolving 5% by mass of polyvinylidene fluoride (binder) in 1-methyl-2-pyrrolidone in advance, thereby preparing a negative electrode mixture paste.

A coin-type battery was produced in the same manner as in Example 1 and Comparative Example 1 except that the negative electrode mixture paste was applied onto a copper foil (collector), then dried, processed under pressure, and punched out into a predetermined size, thereby producing a negative electrode sheet, and the battery was evaluated. The results are shown in Table 4.

TABLE 4

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 24 | 1.1M LiPF$_6$ EC/PC/DEC (5/25/70) | 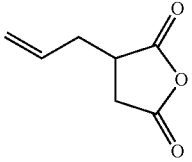 | 0.5 | 67 |
| Comparative Example 6 | 1.1M LiPF$_6$ EC/DEC (30/70) | 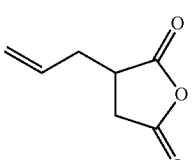 | 0.5 | 52 |

Example 25 and Comparative Example 7

A positive electrode sheet was produced by changing the positive electrode active material used in Example 1 and Comparative Example 1 to lithium-containing olivine-type iron phosphate (LiFePO$_4$) (positive electrode active material) coated with amorphous carbon. 90% by mass of LiFePO$_4$ coated with amorphous carbon and 5% by mass of acetylene black (electroconductive agent) were mixed, and added to and mixed with a solution, which was prepared by dissolving 5% by mass of polyvinylidene fluoride (binder) in 1-methyl-2-pyrrolidone in advance, thereby preparing a positive electrode mixture paste.

A coin-type battery was produced in the same manner as in Example 1 and Comparative Example 1 except that the positive electrode mixture paste was applied onto an aluminum foil (collector), then dried, processed under pressure, and punched out into a predetermined size, thereby producing a positive electrode sheet, the final charging voltage was changed to 3.6 V and the final discharging voltage was changed to 2.0 V in battery evaluation, and the battery was evaluated. The results are shown in Table 5.

by the general formula (I) in an amount of from 0.001 to 10% by mass.

In addition, from the comparison of Example 24 with Comparative Example 6 and the comparison of Example 25 with Comparative Example 7, the similar advantageous effect is found in the case where silicon (elementary substance) is used as the negative electrode and in the case where a lithium-containing olivine-type iron phosphate (LiFePO$_4$) is used as the positive electrode. Accordingly, it

TABLE 5

| | Composition of electrolyte salt Composition of nonaqueous electrolytic solution (Volume ratio of solvent) | Cyclic acid anhydride | Content of cyclic acid anhydride (% by weight) | 0° C. discharge capacity retention rate after 85° C. high-temperature charged storage (%) |
|---|---|---|---|---|
| Example 25 | 1.1M LiPF$_6$ EC/PC/DEC (5/25/70) | 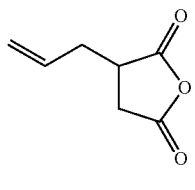 | 0.5 | 86 |
| Comparative Example 7 | 1.1M LiPF$_6$ EC/DEC (30/70) | 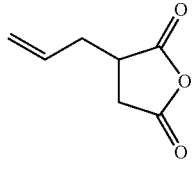 | 0.5 | 73 |

The lithium secondary batteries of Examples 1 to 23 are all remarkably improved in the electrochemical characteristics in a broad temperature range, as compared to the lithium secondary battery of Comparative Example 1 having only one kind of a cyclic carbonate added to the nonaqueous electrolytic solution.

It has been found from the comparison of Example 3 (using the cyclic acid anhydride represented by the general formula (I)) to Comparative Example 2 (using a cyclic acid anhydride having a double bond inside the ring structure, i.e., maleic anhydride), Comparative Example 3 (using a cyclic acid anhydride having a double bond inside the ring structure and having bonded thereto a side chain having 3 or more carbon atoms and having a double bond at an end thereof), Comparative Example 4 (using a cyclic acid anhydride having bonded thereto a side chain that having 2 carbon atoms and having a double bond at an end thereof) and Comparative Example 5 (using a cyclic acid anhydride having bonded thereto a side chain having 3 or more carbon atoms and having a double bond at a position that is not an end thereof) that the advantageous effect of the present invention is peculiar to the cyclic acid anhydride represented by the general formula (I) of the present invention.

It has been found from the above that the advantageous effect of the present invention is peculiar to the nonaqueous electrolytic solution containing a nonaqueous solvent having dissolved therein an electrolyte salt, in which the nonaqueous solvent contains two or more kinds of cyclic carbonates selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate and 4-ethynyl-1,3-dioxolan-2-one, and the nonaqueous electrolytic solution contains a cyclic acid anhydride represented is clear that the advantageous effect of the present invention does not depend on any specific positive electrode or negative electrode.

Furthermore, the nonaqueous electrolytic solution of the present invention also has an advantageous effect of improving the discharge properties of a lithium primary battery in a broad temperature range.

INDUSTRIAL APPLICABILITY

By using the nonaqueous electrolytic solution of the present invention, an energy storage device that is excellent in electrochemical characteristics in a broad temperature range may be obtained. In particular, in the case where the nonaqueous electrolytic solution is used for an energy storage device to be mounted on a hybrid electric vehicle, a plug-in hybrid electric vehicle, a battery electric vehicle and the like, an energy storage device capable of being improved in electrochemical characteristics in a broad temperature range may be obtained.

The invention claimed is:
1. A nonaqueous electrolytic solution, comprising:
a nonaqueous solvent having dissolved therein an electrolyte salt,
wherein the nonaqueous solvent comprises two or more kinds of cyclic carbonates selected from the group consisting of ethylene carbonate, propylene carbonate, 1,2-butylene carbonate, 2,3-butylene carbonate, 4-fluoro-1,3-dioxolan-2-one, trans- or cis-4,5-difluoro-1 3-dioxolan-2-one, vinylene carbonate, vinyl ethylene carbonate and 4-ethynyl-1,3-dioxolan-2-one,
the nonaqueous electrolytic solution further comprises a cyclic acid anhydride of formula (I) in an amount of from 0.01 to 10% by mass:

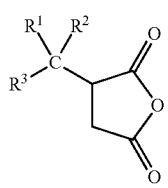 (I)

wherein $R^1$ and $R^2$ are each independently a hydrogen atom, a halogen atom or an alkyl group having from 1 to 6 carbon atoms, wherein a hydrogen atom on the alkyl group may be substituted by a halogen atom; and $R^3$ is a linear or branched alkenyl group having from 2 to 4 carbon atoms and having a double bond at a free end of the linear or branched alkenyl group or a linear or branched alkynyl group having from 2 to 4 carbon atoms and having a triple bond at a free end of the linear or branched alkynyl group.

2. The nonaqueous electrolytic solution according to claim 1, wherein the cyclic acid anhydride of formula (I) is at least one selected from the group consisting of 3-allyldihydrofuran-2,5-dione, 3-(3-methylallyl)dihydrofuran-2,5-dione, 3-(3,3-dimethylallyl)dihydrofuran-2,5-dione, 3-(2-methylallyl)dihydrofuran-2,5-dione, 3-(2,3-dimethylallyl)dihydrofuran-2,5-dione, 3-(2,3,3-trimethylallyl)dihydrofuran-2,5-dione, 3-(2-propyne-1-yl)dihydrofuran-2,5-dione, 3-(1-methyl-2-propyne-1-yl)dihydrofuran-2,5-dione and 3-(1,1-dimethyl-2-propyne-1-yl)dihydrofuran-2,5-dione.

3. The nonaqueous electrolytic solution according to claim 1, wherein the cyclic carbonate is at least one selected from the group consisting of ethylene carbonate, propylene carbonate, vinylene carbonate and vinyl ethylene carbonate.

4. The nonaqueous electrolytic solution according to claim 1, wherein the nonaqueous solvent further comprises a linear ester.

5. An energy storage device, comprising:
a positive electrode;
a negative electrode; and
the nonaqueous electrolytic solution according to claim 4.

6. The energy storage device according to claim 5, wherein the positive electrode comprises active material which is a complex metal oxide of lithium comprising at least one selected from the group consisting of cobalt, manganese and nickel, or a lithium-comprising olivine-type phosphate comprising at least one selected from the group consisting of iron, cobalt, nickel and manganese.

7. The energy storage device according to claim 5, wherein the negative electrode comprises active material which comprises at least one selected from the group consisting of lithium metal, a lithium alloy, a carbon material capable of absorbing and releasing lithium, tin, a tin compound, silicon, a silicon compound and a lithium titanate compound.

8. The nonaqueous electrolytic solution according to claim 4, wherein the linear ester is at least one selected from the group consisting of an asymmetric linear carbonate selected from methyl ethyl carbonate, methyl propyl carbonate, methyl isopropyl carbonate, methyl butyl carbonate and ethyl propyl carbonate, a symmetric linear carbonate selected from dimethyl carbonate, diethyl carbonate, dipropyl carbonate and dibutyl carbonate, and a linear carboxylate ester.

9. An energy storage device, comprising:
a positive electrode;
a negative electrode; and
the nonaqueous electrolytic solution according to claim 8.

10. The energy storage device according to claim 9, wherein the positive electrode comprises active material which is a complex metal oxide of lithium comprising at least one selected from the group consisting of cobalt, manganese and nickel, or a lithium-comprising olivine-type phosphate comprising at least one selected from the group consisting of iron, cobalt, nickel and manganese.

11. The energy storage device according to claim 9, wherein the negative electrode comprises active material which comprises at least one selected from the group consisting of lithium metal, a lithium alloy, a carbon material capable of absorbing and releasing lithium, tin, a tin compound, silicon, a silicon compound and a lithium titanate compound.

12. The nonaqueous electrolytic solution according to claim 1, wherein the nonaqueous solvent further comprises an aromatic compound comprising a fluorine atom, a tert-alkyl group, or both.

13. The nonaqueous electrolytic solution according to claim 1, wherein the nonaqueous solvent further comprises a nitrile.

14. The nonaqueous electrolytic solution according to claim 1, wherein the electrolyte salt comprises at least one selected from the group consisting of $LiPF_6$, $LiPO_2F_2$, $Li_2PO_3F$, $LiBF_4$, $LiN(SO_2CF_3)_2$, $LiN(SO_2C_2F_5)_2$, $LiN(SO_2F)_2$, lithium difluorobis[oxalate-O,O']phosphate and lithium tetrafluoro[oxalate-O,O']phosphate.

15. The nonaqueous electrolytic solution according to claim 1, wherein the electrolyte salt is present at a concentration of from 0.3 to 2.5 M with respect to the nonaqueous solvent.

16. An energy storage device, comprising:
a positive electrode;
a negative electrode; and
the nonaqueous electrolytic solution according to claim 1.

17. The energy storage device according to claim 16, wherein the positive electrode comprises active material which is a complex metal oxide of lithium comprising at least one selected from the group consisting of cobalt, manganese and nickel, or a lithium-comprising olivine-type phosphate comprising at least one selected from the group consisting of iron, cobalt, nickel and manganese.

18. The energy storage device according to claim 16, wherein the negative electrode comprises active material which comprises at least one selected from the group consisting of lithium metal, a lithium alloy, a carbon material capable of absorbing and releasing lithium, tin, a tin compound, silicon, a silicon compound and a lithium titanate compound.

* * * * *